United States Patent
Callum

(10) Patent No.: US 7,298,698 B1
(45) Date of Patent: Nov. 20, 2007

(54) METHOD AND APPARATUS FOR STATISTICALLY CONTROLLING PRIORITY BETWEEN QUEUES

(75) Inventor: Roy Callum, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1085 days.

(21) Appl. No.: 10/325,448

(22) Filed: Dec. 20, 2002

(51) Int. Cl.
*H04L 1/00* (2006.01)

(52) U.S. Cl. .................. 370/231; 370/462; 709/225; 709/226; 709/229

(58) Field of Classification Search ............... 370/230, 370/231, 412–420, 437, 462, 463; 709/225, 709/226, 229
See application file for complete search history.

(56) References Cited

U.S. PATENT DOCUMENTS

| | | | | |
|---|---|---|---|---|
| 4,253,146 A | * | 2/1981 | Bellamy et al. | ............ 709/226 |
| 4,593,282 A | * | 6/1986 | Acampora et al. | .......... 370/447 |
| 4,779,267 A | * | 10/1988 | Limb | ......................... 370/232 |
| 5,208,805 A | * | 5/1993 | Ochiai | ........................ 370/389 |
| 5,353,287 A | * | 10/1994 | Kuddes et al. | ............. 370/448 |
| 6,470,014 B1 | * | 10/2002 | Ono et al. | ............... 370/395.1 |

\* cited by examiner

*Primary Examiner*—Hassan Kizou
*Assistant Examiner*—Bo Hui A. Zhu
(74) *Attorney, Agent, or Firm*—Blakely, Sokoloff, Taylor & Zafman LLP

(57) ABSTRACT

A method and apparatus for controlling access to a plurality of resources at a predetermined ratio based on multiple received requests. The system includes a series of multiplexors, adders, subtractors, multi-bit clocked registers, and comparators arranged to maintain the desired predetermined ratio. The registers act to maintain a first value correlated to a first quantity of requests granted for a first requester in excess of an amount desired according to the predetermined ratio and maintain a second value correlated to a second quantity of requests granted for a second requester with respect to the total requests desired from the second requester. One comparator compares the value from the first register with a predetermined value to assess whether to grant access to the first requestor.

14 Claims, 3 Drawing Sheets

METHOD AND APPARATUS FOR STATISTICALLY CONTROLLING PRIORITY BETWEEN QUEUES

BACKGROUND OF THE INVENTION

1. Field of the Invention

The present invention relates generally to the field of priority control, and more specifically to controlling the priority accorded to more than one queue seeking access to a shared resource.

2. Description of the Related Art

Data communication networks receive and transmit ever increasing amounts of data. Data is transmitted from an originating entity or requester, through the network to a destination, such as a channel or resource. Along this path may be multiple points that receive data, typically in the form of packets or data frames, and along each point data must be routed to the next point in the network in a rapid and efficient manner. Certain protocols or standards may be employed in transferring data from one point to another, and such standards enable hardware and software employing different configurations to effectively receive and transfer the data. Such standards include, but are not limited to, Utopia, X.25, and other standards promulgated by the ITU and ANSI.

The points throughout the data network operate to receive data requests or packets from various requesters and provide results or satisfy requests in an orderly and efficient manner. Requests may arrive synchronously or asynchronously, and requests may be for access to multiple resources or channels or to particular sets of resources or channels. A single requester may request access to multiple resources at one time. The hardware or software at the data transmission point in the data network acts as a traffic officer, deciding which data packets receive priority in transmission while requiring others to wait.

The traditional hardware or software used to perform this access control function has been a form of arbiter. Other designs have been employed, including lookup tables, FIFO arrangements, and other designs known to those skilled in the art. An arbiter receives requests from requesters and allocates those requests among the channels or resources sequentially according to requester position. For example, if requestors one through five seek access to a Channel A, and requesters one through four transmit multiple requests while requester five transmits one request, the arbiter allows access in an ordered manner to requesters one through five and subsequently to one through four until all requests have been satisfied. If requester five has not made a request, the arbiter skips requester five and goes on to the next requester in sequence. If requester five adds a request at some point during arbitration, this new request is satisfied sequentially. This is sometimes referred to as round robin arbitration. Arbitration differs from a FIFO arrangement in that input channels are individually queued in arbitration, while FIFO employs a single queue, and the first request received from any requester is the first request satisfied.

The problems with previous arbitration and FIFO arrangements include a general inability to prioritize the arriving requests in a predetermined ratio, such as permitting channel one to have access to 75 percent of the resource while permitting channel two only 25 percent of the resource. It is desirable for certain requests, requesters, or channels to receive higher priority or greater access to the resource than others. Previous arbitration schemes simply go through the requests from the requesters in order and allow them access to the resource when a request is present and when it is the requestor's "turn." FIFO arrangements cycle through the requests as received with no allowance for priority or ratio of access to the resource. In the previous arbitration arrangement, using the foregoing example, if requester one is to be accorded 25 percent of the accesses to the resource but generates a large number of requests in a short amount of time, while requester two is to be accorded 75 percent of the accesses, the previous arbitration scheme will grant the request from requester one any time the requester one queue includes a request. A FIFO will simply grant access based on order received with no regard to the desired ratio. This granting of a slot to undesirable requests based on the desired ratio hinders system performance by slowing desirable requests. The result is delays to satisfy requests, lower throughput, or incorrect ratio throughput at the data transfer point.

While arbiters and FIFOs are simple, straightforward, and relatively well known, it would be desirable to offer a simple, straightforward mechanism or method that provides for statistical control, such as controlling ratio, between queues using relatively well known devices.

DESCRIPTION OF THE DRAWINGS

The present invention is illustrated by way of example, and not by way of limitation, in the figures of the accompanying drawings in which.

DETAILED DESCRIPTION OF THE INVENTION

The present design addresses the situation where two or more queues of requests seek access to a shared resource and it is desired that the two or more queues obtain access to the shared resource so that the ratio of tasks is fixed, such as at a ratio of M:N or M:N:P. The present design statistically controls the priority of assignment without starving one queue or the other. Further, a daisy-chained system as disclosed can enable multiple queues having multiple ratios, such as M:N:P for three queues. More than three queues can also be served based on the system and method teachings presented herein.

A simple solution to controlling priority when two queues seek access to a resource would be to simply count out M tasks from one queue and N tasks from the other queue. This simple solution works when the queues have tasks available, but if queues produce requests or tasks intermittently or in bursts, use of this simple mechanism results in inefficient use of the shared resource. The resource will be idle waiting for tasks from one queue when the other queue has processed the requisite number of requests or tasks. If the simple mechanism is set up to skip work from a queue when it has no work available, the M:N ratio is not followed.

Figure 1:
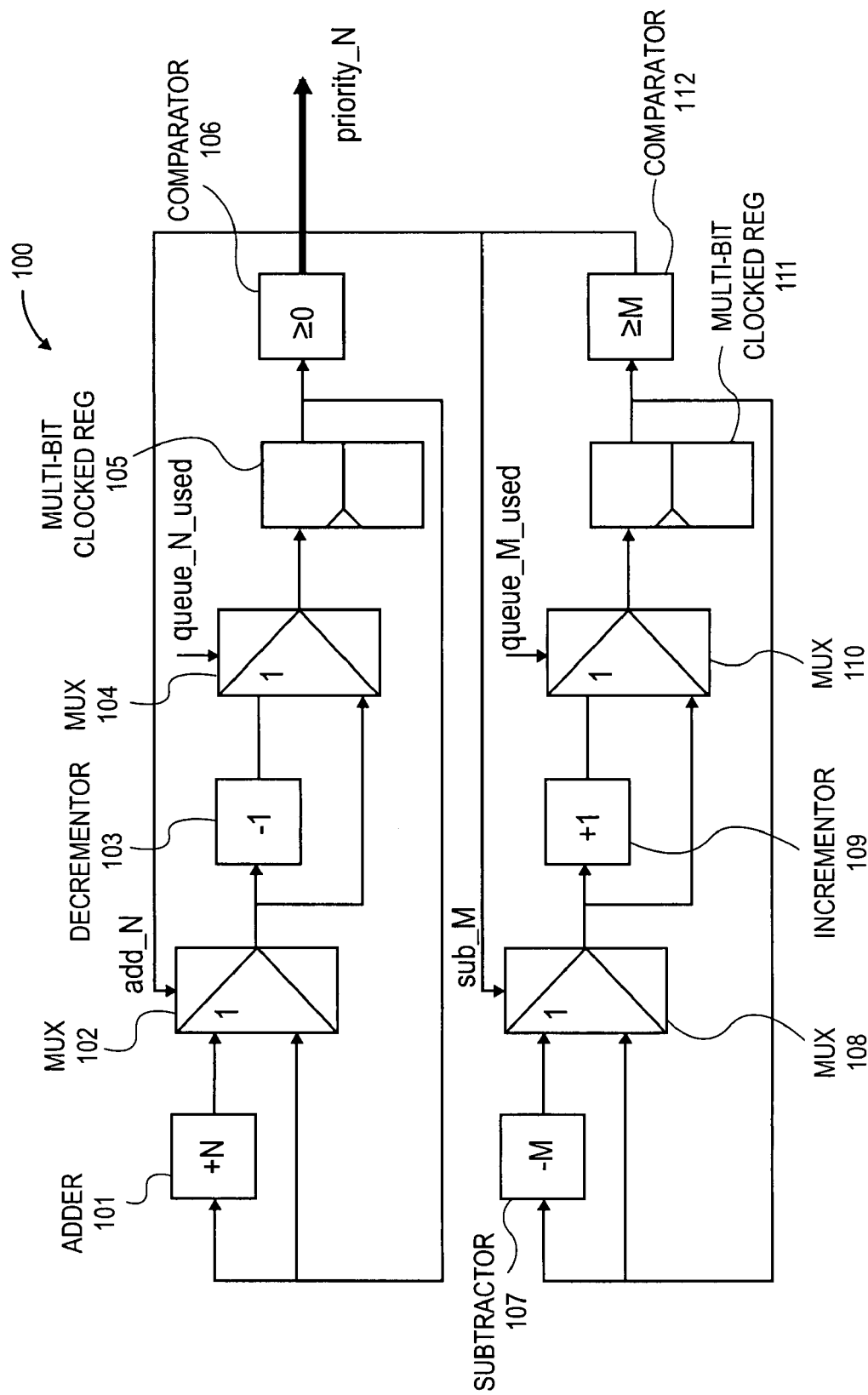
FIG. 1 is a dual level statistical priority controller or arbitrator that controls queue access to a resource at a ratio of M:N.

In the present design, the ratio values such as M and N may generally be from 0 to 15, where the ratio M:N or M:N:P or otherwise is generally maintained without many of the problems associated with previous systems. One aspect of the design is illustrated in FIG. 1. From FIG. 1, multiplexors 102, 104, 108, and 110 receive three inputs and make a decision between the two inputs received on the left side of the multiplexors based on the signal received at the top of the multiplexor. When a signal received at the top of each multiplexor 102, 104, 108, and 110 is True, the signal marked with a "1" is passed for each of multiplexor 102, 104, 108, or 110. Multi-bit clocked registers 105 and 111 are employed as storage and are clocked at the clocking rate of the device. Adder 101 receives an input, adds N to that input, and transmits N plus the input as its output. Subtractor 107 also receives an input, subtracts M from the input, and transmits the input minus M as its output.

Incrementor 109 increments its input, or adds one to the value received. Decrementor 103 decrements its input, or subtracts one from the value received. Comparator 112 determines whether the value received is greater than or equal to M. If the value received by comparator 112 is greater than M, the output is set True; if not, output is set False. Comparator 106 compares the received value to zero, and if the value received is greater than or equal to zero, the output of comparator 106 is True. If the value received is less than zero, the output is set False.

The system 100 receives four values as inputs, namely M, N, queue_M_used and queue_N_used. M and N represent the statistical ratio between the two queues to be allowed access to the resource, while queue_M_used indicates use of the shared resource by queue M, and queue_N_used indicates use of the shared resource by queue M. The values queue_M_used and queue_N_used indicate usage of a queue on a previous frame; thus if queue M is used at frame one, the value of queue_M_used at frame two is True while the value of queue_N_used at frame two is false. The output of the queue is priority_N, which indicates priority should be given to servicing the N queue. If True, priority is given to servicing the N queue, where if False, priority is given to servicing the M queue.

In operation, assume that the desired ratio is three instances of M having access to the resource are to pass for every one instance of N having access to the resource, or an M:N ratio of 3:1. Each time the M queue is used, 1 is added to the value stored in multi-bit clocked register 111. When the value stored in multi-bit clocked register 111 is equal to or exceeds M, M is subtracted from the value stored in multi-bit clocked register 111, and N is added to the value stored in multi-bit clocked register 105. Generally, during the same frame, the value of N is added to the value stored in multi-bit clocked register 105. Every time that queue N is used, a value of 1 is subtracted from the value stored in multi-bit clocked register 105. Thus the value stored in multi-bit clocked register 105 represents the number of N queue tasks needed to be serviced to maintain the M:N ratio. The system tests the output of multi-bit clocked register 105 and if the output of multi-bit clocked register 105 is nonnegative, priority is given to servicing the N queue based on output in the form of priority_N.

For a ratio of 3:1, during a first frame, no value is true coming in to multiplexors 102, 104, 108, or 110. the value in multiplexor 104 is zero, which passes to multi-bit clocked register 105, which is greater than or equal to zero. Thus priority_N is True, and queue N is allowed access to the resource. The value of 0 passes from multi-bit clocked register 111, and 0 is compared against M, or 3, at comparator 112. 0 is not greater than or equal to 3, and thus output of comparator 112 is False, and the signals add_N and sub_M are false as well.

In the next frame, the value of queue_N_used is 1, the value of queue_M_used is 0. Values are fed back from multi-bit clocked register 105 and multi-bit clocked register 111, and in this case values of 0 are fed back in both cases. Adder 101 adds N to 0, for a total of 1. add_N is false, and thus 0 passes to multiplexor 102. queue_N_used is true, and thus the value of (0-1) or −1 is received from subtractor 103 and passes at multiplexor 104. The value of −1 is stored in multi-bit clocked register 105. In the lower path, subtractor 107 subtracts 1 from 0, but sub_M is false, and thus 0 passes through multiplexor 108. queue_M_used is False, and 0 passes from multiplexor 110 and 0 is stored in multi-bit clocked register 111. The output of comparator 106 is False, and thus one priority M request is permitted. The value in comparator 112 remains False, as the value in multi-bit clocked register 111 remains 0.

In frame three, queue_N_used is False, queue_M_used is True, and sub_M and add_N are both False. Thus the lower paths are used for both multiplexor 102 and multiplexor 104, with −1 passed from multi-bit clocked register 105 and 0 from multi-bit clocked register 111. The lower value is passed at multiplexor 104 of −1, while 1 is added at incrementor 109 to the 0 value to produce 1 coming from multiplexor 110 to multi-bit clocked register 111. One is still not greater than or equal to 3, thus output from comparator 112 is False, while the −1 in multi-bit clocked register 105 again makes comparator 106 false. Thus M is allowed access in frame three, with values in multi-bit clocked register 105 being −1 and multi-bit clocked register 111 being 1. Frame four operates much like frame three, allowing the M queue access while only incrementing the value in multi-bit clocked register 111 to 2. Frame five operates in the same manner as frame four, but the value in multi-bit clocked register 111 is 3, which is greater than or equal to 3, and thus output from comparator 112 is True, and sub_M and add_N are True. Frame five allows the M queue access to the resource.

In frame six, both multiplexors 102 and 108 pass the upper levels since sub_M and add_N are True. The value in multi-bit clocked register 105 is −1, while the value in multi-bit clocked register 111 is 3. Adder 101 adds 1 to −1 to produce 0, and with queue_N_used False, multiplexor 104 passes the value of 0 to multi-bit clocked register 105. 0 is greater than or equal to 0, so comparator 106 allows access to the N queue. In the lower segment, 3 is fed back from multi-bit clocked register 111 and subtractor 107 subtracts 3 from this value, yielding 0. queue_M_used is True, and thus 1 is added to 0 to produce 1 from multiplexor 110 to multi-bit clocked register 111. The value of 1 is not greater than or equal to 3, and thus the value from comparator 112 is False. Further frames progress in a manner similar to that described in this example.

The value maintained in multi-bit clocked register 105 at any given frame thus correlates to a quantity of N requests granted more than desired according to the ratio. For −1 in multi-bit clocked register 105, this correlates to one more N request granted than desired to maintain the ratio. The value maintained in multi-bit clocked register 111 at any given frame thus correlates to a quantity of M requests granted with respect to the total M requests desired. For a value of 2 contained in multi-bit clocked register 111, this correlates to 2 M requests granted of the 3 desired M value. The value in multi-bit clocked register 105 my go exceedingly negative, while the value in multi-bit clocked register 105 may go exceedingly positive depending on the requests received.

The bit width of multi-bit clocked register 105 and multi-bit clocked register 111 is finite. The bit width of multi-bit clocked register 111 generally should be one bit wider than the binary value accorded to M. For M able to vary between, for example, 0 and 15, inclusive, the multi-bit clocked register 111 may be five bits wide (four bits for values 0-15 plus one bit). The size of multi-bit clocked register 105 is larger, as this multi-bit clocked register 105 provides storage of the averaging data over time and typically includes a sign bit. In the implementation shown, the contents of multi-bit clocked register 105 can be either positive or negative and thus the register must allow for a sign bit. Multi-bit clocked register 111 in this aspect only includes positive numbers or zero and thus may omit a sign bit. The size of each multi-bit clocked register depends on the application and the number of requests received in a given amount of time, but for a general networking implementation in accordance with the foregoing example, a 9 bit representation is generally sufficient for multi-bit clocked register 105. Greater values of M or N, or a significant number of requests from one queue arriving before another queue, may require additional bit width for multi-bit clocked register 105. Multi-bit clocked registers 105 and 111 may be provided with overflow testing capability such that the values included do not exceed the bit width. An overflow condition indicates requests are arriving from one queue and not the other. In such a condition, a maximum value may be maintained, and additional accesses by the oversubscribed queue may be discarded or ignored using overflow protection. Thus if queue M constantly is accorded access to the resource because no queue N requests are available, multi-bit clock register 111 keeps incrementing until a maximum value is reached based on bit width, for example 32, and any received M access is ignored and the value in multi-bit clocked register 111 remains 32. When an N request is granted, M counts down from 32 and the system 100 seeks to maintain the M:N ratio from that point forward. Simply put, if 50 requests are received from queue M while 0 requests are received from queue N, few practical systems can maintain a reasonable M:N ratio for access.

Figure 2:
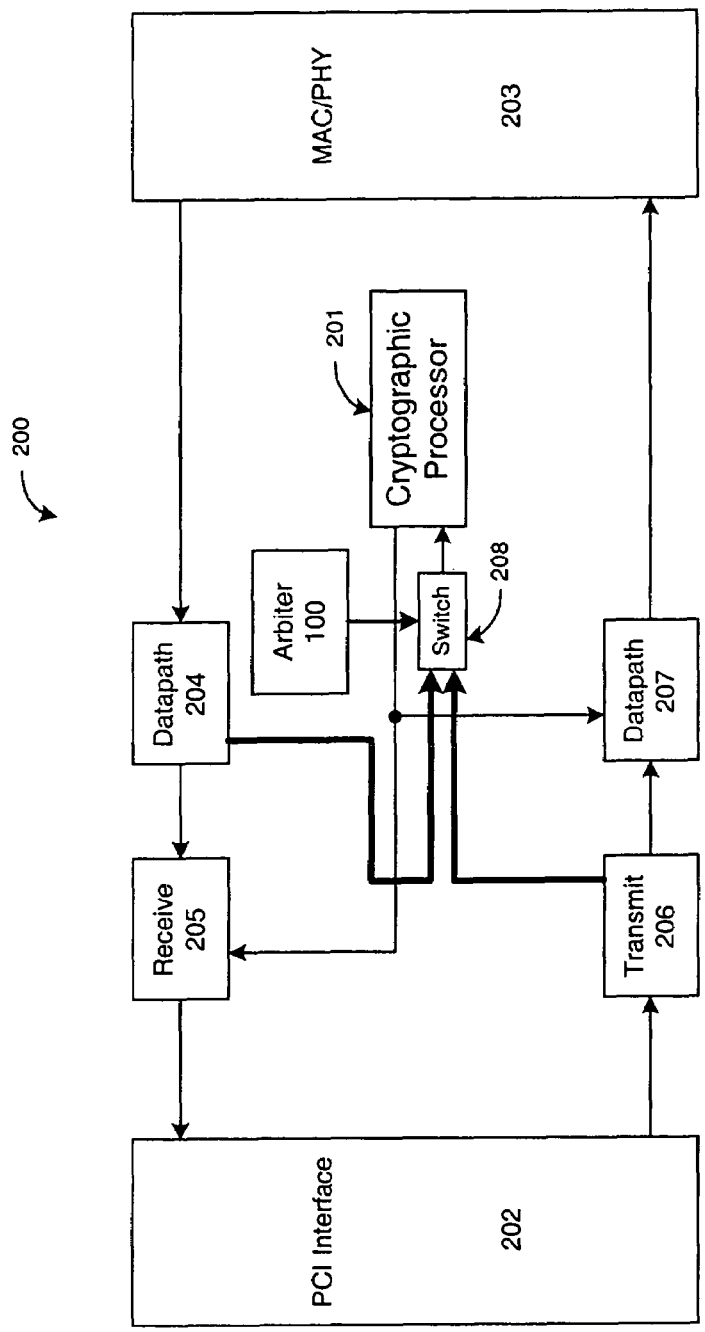
FIG. 2 illustrates one hardware implementation of the statistical priority controller or arbitrator that controls access to a resource at a ratio of M:N, specifically within a network interface hardware setting.

A system employing the design is illustrated in FIG. 2. From FIG. 2, cryptographic processor 201 is requested by various network requesters, and the system 200 controls access to the cryptographic processor 201. The system 200 represents a network interface card (NIC), having a PCI (Peripheral Component Interconnect) interface 202, representing a circuit board bus connection to connect boards to memory and the CPU (central processing unit) within network hardware. The MAC/PHY 203 is the Medium Access/Physical Layer that provides access to the Physical Layer of the network hardware. MAC/PHY 203 provides data along datapath 204 and is received at receiver 205 for PCI Interface 202. PCI Interface 202 employs transmitter 206 to transmit data via datapath 207 back to MAC/PHY 205. Datapath 204 passes data in the form of requests to switch 208, while transmitter 206 also passes data in the form of requests to switch 208. Arbiter 100 controls access of the datapath 204 and transmitter 206 to the cryptographic processor 201. For example, in accordance with the terminology used in the foregoing discussion of FIG. 1, datapath 204 may be considered queue M and transmitter 206 considered queue N. The desired ratio may be, for example, 3 datapath 204 requests for every 2 transmitter 206 requests. Receipt of an N request at switch 208 indicates permitting access to the cryptographic processor 201 by transmitter 206, while receipt of a "not N" or M request from arbiter 100 enables the datapath 204 to have access to cryptographic processor 201. The cryptographic processor 201 may transmit results to receiver 205 or datapath 207 as shown in FIG. 2 or to some other desired location.

The arbiter 100 is therefore employed to control which path has access to cryptographic processor 201 at any one time. M and N in this implementation are programmed into registers where M controls the receive path priority and N controls the transmit path priority.

Figure 3:
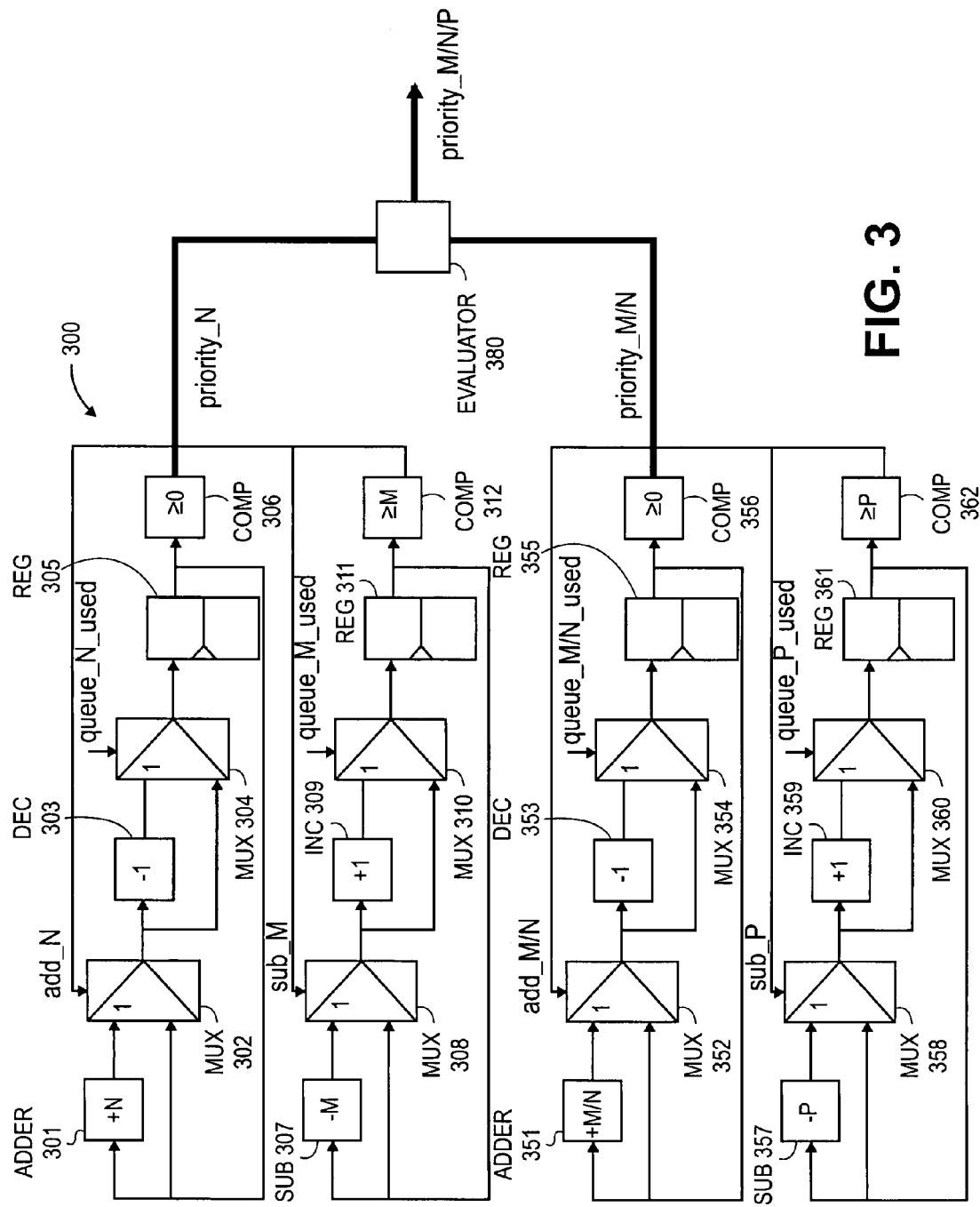
FIG. 3 is a multiple level statistical priority controller or arbitrator that controls queue access to a resource at a ratio of M:N:P.

The design may be extended in certain circumstances to multiple queues. For example, if three queues M, N, and P seek access to one resource, and it is desired to maintain a ratio of 50 percent access to M, 25 percent access to N, and 25 percent access to P, a daisy-chained arrangement of the arbiter of FIG. 1 may be provided as shown in FIG. 3. For the M:N:P ratio of 50:25:25 or 2:1:1, the system first employs a design virtually identical to that of FIG. 1 to decide between queues M and N. In this arrangement, M is 2 while N is 1, a ratio of 2:1 between M and N, equivalent to two M access indications for every N indication.

From FIG. 3, multiplexors 302, 304, 308, and 310 receive three inputs and make a decision between the two inputs received on the left side of the multiplexors based on the signal received at the top of the multiplexor. When the signal received at the top is True, the signal marked with a "1" is passed for each multiplexors 302, 304, 308, and 310. Multi-bit clocked registers 305 and 311 are employed as storage and are clocked at the clocking rate of the device. Adder 301 receives an input, adds N to that input, and transmits N plus the input as its output. Subtractor 307 also receives an input, subtracts M from the input, and transmits the input minus M as its output.

Incrementor 309 increments its input, or adds one to the value received. Decrementor 303 decrements its input, or subtracts one from the value received. Comparator 312 determines whether the value received by comparator 312 is greater than M, the output is set True; if not, output is set False. Comparator 306 compares the received value to zero, and if the value received is greater than or equal to zero, the output of comparator 306 is True. If the value received is less than zero, the output is set False.

Operation of this system is similar to that of the design in FIG. 1. The same inputs are received, and output is either True or False, where True indicates provide queue N with access, and False indicates provide queue M with access.

This priority_N value, true or false, passes to the second stage, which decides between M/N queue and P queue. To maintain the 2:1:1 ratio from the foregoing example, the value of M/N would be 3:1, meaning 3 M/N requests pass for every one P request.

Multiplexors 352, 354, 358, and 360 receive three inputs and make a decision between the two inputs received on the left side of each multiplexor based on the signal received at the top of the multiplexor. When the signal received at the top is True, the signal marked with a "1" is passed for each multiplexors 352, 354, 358, and 360. Multi-bit clocked registers 355 and 361 are employed as storage and are clocked at the clocking rate of the device. Adder 351 receives an input, adds M/N (in this example, 3) to that input, and transmits M/N plus the input as its output. Subtractor 357 also receives an input, subtracts P (1 in this example) from the input, and transmits the input minus P as its output.

Incrementor 359 increments its input, or adds one to the value received. Decrementor 353 decrements its input, or subtracts one from the value received. Comparator 362 determines whether the value received is greater than or equal to P. If the value received by comparator 362 is greater than P, the output is set True; if not, output is set False. Comparator 356 compares the received value to zero, and if the value received is greater than or equal to zero, the output of comparator 356 is True. If the value received is less than zero, the output is set False.

If the output of comparator 356 is False, requestor P is provided with access to the resource. If the output of comparator 356 is True, either requestor M or N is provided access to the resource, depending on the output from comparator 306. Certain special processing must exist for this additional queue access analysis. Evaluator 380 determines the queue allowed based on the signals received from comparator 306 and comparator 356. For example, if priority_N is True and priority_M/N is True, Priority N is transmitted. As may be appreciated, resetting of registers, setting feedback values such as add_N and sub_M, and compensating for allowing one queue access but not the other two queues requires slight modifications that would be within the skill of one knowledgeable in the art. For example, in a situation where P is granted, where priority_N is either True or False but priority_M/N from comparator 356 is False, Priority P is allowed. However, in the subsequent frame, queue_M_used and queue_N_used feeding multiplexors 304 and 310, for example, would not both be set False. The upper elements would not change until either the M queue or the N queue is granted. In this manner, multiple queues can be offered access to the resource at a predetermined statistical ratio between requesting queues.

It will be appreciated to those of skill in the art that the present design may be applied to other systems that perform arbitration, and is not restricted to the arbitration structures and processes described herein.

Further, while specific queues, channels, requesters, ratios, and resources have been discussed herein, it is to be understood that more or less or different types of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A system for controlling access to a resource, wherein access to the resource is enabled at a predetermined ratio between requestors, comprising:
   a first request register configured to maintain a first value correlated to a first quantity of requests granted for a first requestor in excess of an amount desired according to the predetermined ratio;
   a second request register configured to maintain a second value correlated to a second quantity of requests granted for a second requestor with respect to total requests desired from the second requestor;
   a first comparator coupled to compare the value from the first register with a predetermined value to generate a signal for granting priority access to the resource to one of the first or second requestors; and
   a second comparator for comparing the second value from the second register to the total requests desired from the second requestor.

2. The system of claim 1, further comprising a first plurality of multiplexors configured to receive signals based on the results of the second comparator, wherein a valid signal from the second comparator causes the plurality of multiplexors to change values according to the predetermined ratio.

3. The system of claim 2, further comprising a second plurality of multiplexors configured to receive indication of a previous frame request granted and allow signals to pass based on the previous frame request granted.

4. The system of claim 3, further comprising:
   an incrementor coupled to the first request register to increment the first value by a first integer representing that portion of the predetermined ratio associated with the first requestor; and
   a decrementor coupled to the second request register to decrement the second value by a second integer representing that portion of the predetermined ratio associated with the second requestor.

5. The system of claim 1, further comprising:
   an incrementor coupled to the first request register to increment the first value by a first integer representing that portion of the predetermined ratio associated with the first requestor; and
   a decrementor coupled to the second request register to decrement the second value by a second integer representing that portion of the predetermined ratio associated with the second requester.

6. The system of claim 1, further comprising a switch connected to the first comparator enabling access to the resource based on the value received from the first comparator.

7. A method of controlling access to a resource according to a predetermined ratio between requestors, comprising:
   computing a first value correlated to a first quantity of requests granted for a first requester in excess of an amount desired according to the predetermined ratio;
   calculating a second value correlated to a second quantity of requests granted for a second requestor with respect to the total requests desired from the second requestor according to the predetermined ratio;
   comparing the first value with a predetermined value to assess whether to grant access to the first requestor;
   comparing the second value to the total requests desired from the second requestor to generate a signal fed back to cause a change in the first and second values according to the predetermined ratio dependent upon the signal; and
   granting access priority to one of the first or second requestors for accessing the resource dependent upon the comparing of the first value with the predetermined value.

8. The method of claim 7, further comprising:
   further receiving indication of a previous frame request granted; and
   allowing signals to pass based on the previous same request granted.

9. The method of claim 7, further comprising:
   incrementing the first value by a first integer representing that portion of the predetermined ratio associated with the first requestor; and
   decrementing the second value by a second integer representing that portion of the predetermined ratio associated with the second requestor.

10. A system for controlling access to a resource according to a predetermined ratio between requestors, comprising:
   a request register containing a value;
   a ratio alteration block connected to the request register;
   a first multiplexor configured to receive the value from the request register and a quantity from the ratio alteration block;
   a unitary alteration block connected to the first multiplexor and configured to alter a first multiplexor value received from the first multiplexor by one unit;

a second multiplexor configured to receive input from the unitary alteration block and the first multiplexor; and a comparator coupled to compare output from the request register to a predetermined value to generate a signal for granting priority access to the resource between the requestors, wherein the request register receives the value from the second multiplexor.

11. The system of claim 10, wherein output from said comparator indicates a requestor granted access to the resource.

12. The system of claim 10, further comprising:

a second request register containing a second value;

a second ratio alteration block connected to the second request register;

a third multiplexor configured to receive the second value from the request register and a second quantity from the ratio alteration block;

a second unitary alteration block connected to the third multiplexor and configured to alter a third multiplexor value received from a third multiplexor by one unit; and a fourth multiplexor configured to receive input from the second unitary alteration block and the third multiplexor;

wherein the second request register receives the value from the fourth multiplexor.

13. The system of claim 12, further comprising a second comparator for comparing output from the register to a second predetermined value.

14. The system of claim 13, wherein output from said second comparator provides input to said first multiplexor and said third multiplexor.

* * * * *